United States Patent
Saporetti et al.

(10) Patent No.: US 12,450,453 B2
(45) Date of Patent: Oct. 21, 2025

(54) APPARATUS AND METHODS UTILIZING MULTIPLE MODES TO SYNCHRONIZE IMAGE ACQUISITION BY MULTIPLE LINEAR SCANNERS

(71) Applicant: Datalogic IP Tech, S.r.l., Bologna (IT)

(72) Inventors: Claudio Saporetti, Bologna (IT); Matteo Di Giorgio, Loreto Aprutino (IT)

(73) Assignee: Datalogic IP Tech, S.r.l., Bologna (IT)

( * ) Notice: Subject to any disclaimer, the term of this patent is extended or adjusted under 35 U.S.C. 154(b) by 333 days.

(21) Appl. No.: 18/202,047

(22) Filed: May 25, 2023

(65) Prior Publication Data

US 2024/0394488 A1    Nov. 28, 2024

(51) Int. Cl.
  *G06K 7/10* (2006.01)
  *G06K 7/14* (2006.01)
(52) U.S. Cl.
  CPC ..... *G06K 7/10435* (2013.01); *G06K 7/10752* (2013.01); *G06K 7/1465* (2013.01)
(58) Field of Classification Search
  CPC .................................................. G06K 7/10435
  USPC ....................................................... 235/474
  See application file for complete search history.

(56) References Cited

U.S. PATENT DOCUMENTS

| | | | |
|---|---|---|---|
| 7,398,927 B2 | 7/2008 | Olmstead et al. | |
| 8,371,505 B1 * | 2/2013 | Zolotov | G06K 7/1404 235/462.24 |
| 10,853,757 B1 * | 12/2020 | Hill | G06V 20/52 |
| 11,108,946 B1 * | 8/2021 | Gurevich | G06K 7/10811 |
| 2010/0013934 A1 | 1/2010 | Saporetti | |
| 2013/0307977 A1 | 11/2013 | Saporetti | |
| 2020/0259896 A1 | 8/2020 | Sachs et al. | |
| 2021/0365914 A1 | 11/2021 | Oe | |

FOREIGN PATENT DOCUMENTS

| | | |
|---|---|---|
| EP | 2126781 B1 | 5/2010 |
| JP | 2016162100 A | 9/2016 |

OTHER PUBLICATIONS

Extended European Search Report dated Oct. 14, 2024, for European Application No. 24177069.2-1201, 10 pages.

* cited by examiner

Primary Examiner — Toan C Ly
(74) Attorney, Agent, or Firm — Cozen O'Connor (57) ABSTRACT

A system including at least one linear scanner. The system utilizes multiple modes to synchronize image acquisition of the at least one linear scanner. A first mode directly triggers image acquisition by the at least one linear scanner based on a distance a conveyor of the object carrying a machine-readable symbol has advanced. A second mode includes sending a speed value for the conveyor. The system transitions between the first mode and the second mode based on an operating parameter of the system to optimize performance of the system. The first mode is more accurate at slower conveyor speeds, for example during stop and go events, and the second mode uses less bandwidth at higher speeds, for example during steady-state operation.

20 Claims, 6 Drawing Sheets

APPARATUS AND METHODS UTILIZING MULTIPLE MODES TO SYNCHRONIZE IMAGE ACQUISITION BY MULTIPLE LINEAR SCANNERS

BACKGROUND

Technical Field

The present disclosure relates to image acquisition in general, and more specifically to image acquisition with linear scanners that are positioned so as to have at least a partially shared field of view, and that are synchronized using multiple modes that reduce overexposure of images acquiring at least a portion of the shared field of view.

Description of the Related Art

Machine-readable symbols encode useful, optically-readable information about the items to which they are attached or otherwise associated. The information is encoded in a form that can be optically read via a machine-readable symbol reader.

Machine-readable symbols encode information (e.g., a character string or a number) as a set of shapes (e.g., bars and spaces or OCR digits) with varying dimensions based on the rules of a machine-readable symbology. A large number of symbologies have been developed and are in use, for example Universal Product Code (UPC), European Article Number (EAN), Code 39, Code 128, Data Matrix, PDF417, OCR A, OCR B, etc.

Machine-readable symbols have widespread and varied applications. For example, machine-readable symbols can be used to identify a class of objects (e.g., merchandise) or unique items (e.g., patents). As a result, machine-readable symbols are found on a wide variety of objects, such as retail goods, company assets, and documents, and help track production at manufacturing facilities and inventory at stores (e.g., by scanning items as they arrive and as they are sold). In addition, machine-readable symbols may appear on a display of a portable electronic device, such as a mobile telephone, personal digital assistant, tablet computer, laptop computer, or other device having an electronic display. Machine-readable symbols take a variety of forms. Examples of known machine-readable symbols include a bar code (a linear or one dimensional symbol) and area matrix code symbols (e.g., QR codes), which are two dimensional symbols. These machine-readable symbols are typically composed of patterns of high and low reflectance areas. Bar codes include alternating bars (i.e., relatively dark areas) and spaces (i.e., relatively light areas). The pattern of alternating bars and spaces and the widths of those bars and spaces represent a string of binary ones and zeros, and the width of any particular bar or space is an integer multiple of a specified minimum width, referred to as a "module" or "unit." Thus, to decode the information, a bar code reader, such as an imager-based reader, must be able to reliably discern the pattern of bars and spaces, such as by determining the locations of edges demarking adjacent bars and spaces from one another, across the entire length of the bar code.

Area matrix symbols may include a pattern of black marks (e.g., bars, squares or hexagons) on a white background. Machine-readable symbols are not limited to being black and white, but may comprise two other colors, and may include more than two colors (e.g., more than black and white). Machine-readable symbols may include directly marked materials (i.e., direct part marking or DPM) having the symbols formed in surface relief (e.g., etched or otherwise inscribed in a surface). A QR code typically includes a plurality of black (or darker) squares arranged within a white (or lighter) background. Data is extracted from the patterns present in both the horizontal and vertical components of the QR code.

One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relatively narrow beam or spot of light sequentially across the machine-readable symbol. Machine-readable symbol readers are commonly referred to as a "scanner" or "barcode scanner" whether they employ flood illumination or a scanning laser beam, or whether they read one-dimensional or two-dimensional machine-readable symbols.

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. Two-dimensional CCD or CMOS readers may capture an entire two-dimensional image. The image is then processed with well-known image processing techniques to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

One-dimensional CCD or CMOS readers capture a single-line image at a time. When objects move with a well-known speed in front of a linear reader, the reader can be positioned to acquire the object line by line and reconstruct its two-dimensional image in memory. The reconstructed image may then be processed (similar to images coming from a two-dimensional reader) to localize and read any machine-readable symbol(s) within the image.

When acquiring lines of images of a moving target using one-dimensional cameras, capturing subsequent images at constant distances may be impactful on the reconstruction of undistorted images. Acquiring lines of the moving object at too high of an acquisition speed increases the apparent size of the object in the direction of movement. Acquiring lines at too low of an acquisition speed reduces the apparent size of the object in the direction of movement. Some known systems that include one-dimensional cameras may receive information on the speed of the object's movement and adapt their acquisition speed coherently.

When the objects acquired by a linear camera are moving via a conveyor, the information of the object's movement (e.g., speed) may be provided to the camera by an optical encoder that is physically connected to the conveyor. Every time the conveyor advances by a given distance (referred to as an "encoder step") the encoder generates a rising edge on its output. The physical encoder is sometimes substituted by a digital output of the PLC controlling the conveyor generating the same type of signal.

When the conveyor runs at a nearly constant speed, potentially any encoder step is acceptable. The camera measures the period between rising edges of the encoder, estimates the object speed, and adapts its acquisition period to obtain equally spaced lines. When the linear cameras are supposed to acquire images when the conveyor stops and restarts, using a long encoder step is unacceptable as the time between speed measurements increases and the object's speed changes too much between measurements. This results in the camera no longer being able to acquire equally spaced lines. A high-resolution encoder may be used to overcome these deficiencies, as a smaller encoder step reduces the time between subsequent speed measurements. The best results may be obtained using the encoder to directly trigger the line acquisition of each camera, such that all of the cameras acquire every fixed number of encoder pulses, usually one.

Imager-based readers often can only form images from one perspective, usually that of a normal vector out of the face of the imager. Also, when labels carrying a machine-readable symbol are oriented such that the illumination source is reflected directly into the imager, the imager may fail to read the machine-readable symbol properly due to uniform reflection washing out the desired image entirely, or the imager may fail to read properly due to reflection from a textured surface washing out one or more elements. This effect may cause reading of shiny labels to be problematic at particular reflective angles. In addition, labels oriented at extreme acute angles relative to the imager may not be readable. Lastly, the optical code may be oriented on the opposite side of the package, being hidden from view of the imager by the package itself.

Thus, better performance could result from capturing images using multiple machine-readable symbol readers. A few imager-based readers that generate multiple perspectives are known. One such reader is disclosed in U.S. Pat. No. 7,398,927, in the names of inventors Olmstead et al., which discloses an embodiment having two cameras to collect two images from two different perspectives for the purpose of mitigating specular reflection.

Additionally, a system may include multiple scanners (e.g., linear scanners) positioned in proximity to a conveyor (e.g., a conveyor belt that transports objects supported on a surface of the conveyor belt) so as to capture images of multiple, up to all, faces of the transported objects. Some of the multiple machine-readable symbol readers may be arranged with partially overlapping fields of view with others of the multiple machine-readable symbol readers so as to eliminate blind spots on the transported objects, hidden from view of all of the multiple machine-readable symbol readers.

One problem that results from machine-readable symbol readers with a shared field of view is overexposure. Each machine-readable symbol reader includes an illuminator that illuminates the field of view of the respective machine-readable symbol reader, and multiple illuminators associated with machine-readable symbol readers with a shared field of view that simultaneously illuminate the object may overexpose the object, effectively blinding each other, and potentially degrading images captured of any machine-readable symbol (or any portion thereof) positioned within the shared field of view.

Known systems and methods to reduce/avoid overexposure of an object due to overlapping fields of view of multiple machine-readable symbol readers have limitations and drawbacks described in detail below. The applicant has, therefore, determined that it would be desirable to provide systems and methods that improve on the limitations of existing machine-readable symbol readers.

BRIEF SUMMARY

According to one embodiment, a system includes at least a linear scanner and a controller. The linear scanners have a field of view and acquire images of machine-readable symbols within the field of view. The machine-readable symbol reader is positionable relative to a conveyor such that an object transported by the conveyor passes through the field of view of at least one of the linear scanners.

The controller receives data as input, the data indicating a speed of the object and a distance the object has travelled, and the controller sends an output to the linear scanners.

When the indicated speed of the object is below a threshold value, the output includes a line trigger that initiates acquisition of an image by the linear scanners. When the indicated speed of the object is at or above the threshold value the output includes the indicated speed of the object, and the linear scanners compute the acquisition rate accordingly.

According to one embodiment, a system includes at least one linear scanner having a field of view. The at least one linear scanner acquires images of machine-readable symbols within the field of view, and the linear scanner is positionable relative to a conveyor such that an object transported by the conveyor passes through the first field of view.

The system includes a controller that receives data as input that indicates movement of the object, the controller computes the speed of the object, and the controller is communicatively coupled to the at least one linear scanner and sends an output to the at least one linear scanner. When the calculated speed of the object is below a threshold value, the output includes a line trigger that initiates acquisition of an image by the at least one linear scanner, and when the calculated speed of the object is at or above the threshold value the output includes the calculated speed of the object.

According to one embodiment, a method of acquiring images of a machine-readable symbol includes recording a series of pulses that correspond to a conveyor advancing a unit of distance, and sending the recorded series of pulses to a controller. The method further includes determining a speed at which the conveyor is advancing based on the recorded series of pulses, and measuring a period between adjacent ones of the series of pulses.

If the period is at or above a threshold value, the method includes sending instructions to a linear scanner to acquire an image of a machine-readable symbol carried by the object every time a specific number of pulses are received by the controller. After receiving the instructions, the method includes acquiring an image of the machine-readable symbol carried by the object when the machine-readable symbol is within a field of view of the linear scanner.

If the period is below a threshold value, the method includes sending the determined speed value to the linear scanner periodically or when the determined speed changes by a threshold amount. After receiving the determined speed value, the method includes acquiring an image of the machine-readable symbol carried by the object when the machine-readable symbol is within the field of view of the linear scanner.

According to one embodiment, a method of acquiring images of a machine-readable symbol includes generating data that corresponds to advancement of a conveyor. If a speed of the conveyor below a threshold value the method further includes sending the data to a linear scanner positioned relative to the conveyor such that an object carried by the conveyor passes through a field of view of the linear scanner, and acquiring an image of a machine-readable symbol carried by the object with the linear scanner every time the conveyor advances a first distance. If the speed of the conveyor is below the threshold value the method further includes sending the data to the linear scanner, and acquiring an image of the machine-readable symbol periodically or every time the speed of the conveyor changes by at least a first amount.

According to one embodiment, a method of acquiring images of a machine-readable symbol includes advancing a conveyor at a first speed, thereby moving an object supported by the conveyor at the first speed, sending a first set of instructions to a linear scanner, wherein the first set of instructions include the first speed. The method further includes adjusting at least one operating parameter of the linear scanner based on the first speed, and after adjusting the at least one operating parameter, acquiring an image of a machine-readable symbol carried by the object with the linear scanner. The method further includes advancing the conveyor at a second speed that is slower than the first speed, thereby moving the object supported by the conveyor at the second speed, and sending a second set of instructions to the linear scanner every time the conveyor advances a certain distance, the second set of instructions triggering the linear scanner to acquire respective images of the machine-readable symbol carried by the object.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the linear scanners and machine-readable symbol readers have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

As used in this specification and the appended claims, the terms "active light source" or "active illumination source" mean a device or structure that generates light. Examples of active light sources or active illumination sources include, but are not limited to light emitting diodes (LEDs), flash strobes, incandescent or fluorescent lamps, or halogen bulbs. Such are typically responsive to some stimulus, for example an electric current or voltage.

The headings and Abstract of the Disclosure provided herein are for convenience only and do not limit the scope or meaning of the embodiments.

Figure 1:
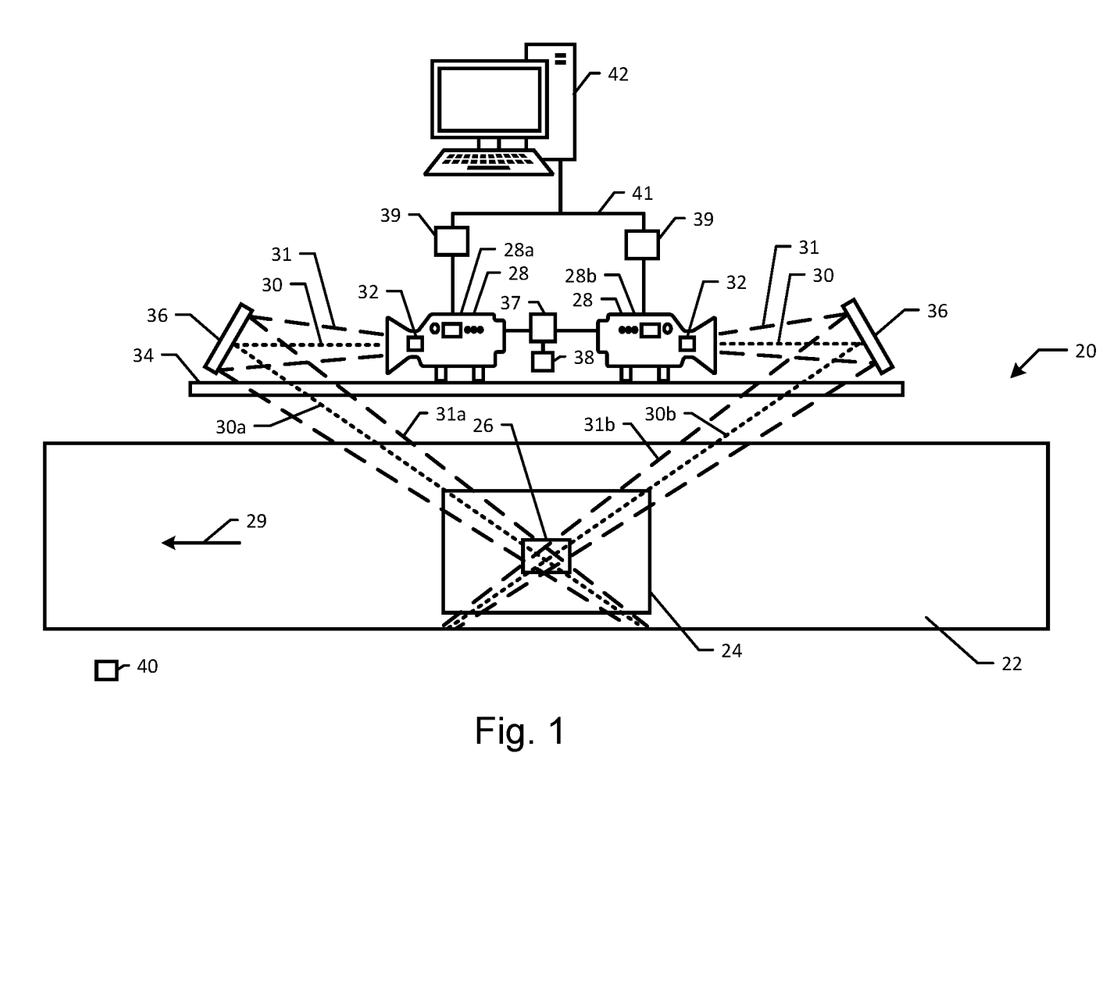
FIG. 1 is a schematic diagram of a system including multiple linear scanners and an object bearing a machine-readable symbol to be read, according to at least one illustrated embodiment.

Referring to FIG. 1, a system 20 may include a conveyor 22 (e.g., a conveyor belt) that moves an object 24 along a defined path. The object 24 may include a machine-readable symbol 26 (e.g., a bar code, a QR code, etc.) that includes information associated with the identity of the object 24. The system 20 may include one or more linear scanners 28 that each have a respective field of view 30 and an illumination field 31. The field of view 30 of each of the one or more linear scanners 28 may be aligned with a respective lens axis (as shown) and extend away from the respective linear scanner 28.

Each of the one or more linear scanners 28 may be positioned such that its respective field of view 30 intersects a path along which the object 24 travels enabling the linear scanner 28 to scan the object 24 and the machine-readable symbol 26 when the object 24 and the machine-readable symbol 26 pass through the respective field of view 30 of the linear scanner 28. The system may include one or more machine-readable symbol readers, and according to one embodiment, one or more of the linear scanners 28 may be an integral component of the one or more machine-readable symbol readers.

The system 20 is illustrated as including two linear scanners 28, both positioned on the same side of the conveyor 22. No additional linear scanners 28 may be necessary if it is known that all of the machine-readable symbols 26 will be carried on one side of the object 24 that passes through the fields of view 30 of the two linear scanners 28. However, it is not often known which face(s) of the object 24 support the machine-readable symbol 26. Thus, the system 20 may include additional linear scanners 28 on other sides of the conveyor 22. According to one embodiment, the system 20 may include only one linear scanner 28.

According to one embodiment, the system 20 may include one or more of the linear scanners 28 on each of the lateral sides of the conveyor 22 (e.g., spaced along a direction perpendicular to the direction of movement of the conveyor 22, indicated by arrow 29). One, two, three, or more additional linear scanners 28 may be positioned laterally opposite ("below" in the illustration) the linear scanners 28 shown. The system 20 may include one or more of the linear scanners 28 with fields of view 30 directed to "front" and/or "back" sides of the conveyor 22 (e.g., spaced along a direction parallel to the direction of movement of the conveyor 22), "left" and "right" in the illustration. The system 20 may include one or more of the linear scanners 28 with fields of view 30 directed to "top" and/or "bottom" sides of the conveyor 22 (e.g., spaced along a direction perpendicular to the direction of movement of the conveyor 22) into and out of the page in the illustration.

The linear scanner 28 may include a camera that collects images from which the information for identifying the object 24 is extracted. The collected image may be an image of the object 24, or the machine-readable symbol 26. The image collection is executed by a suitable optical system and dedicated opto-electronics and electronics. The optical system may include a CCD or a CMOS of linear type comprising an array of photo-sensitive elements (also called pixels).

The image may be acquired by storing subsequent scans, each of which represents a thin "line" of the whole image. The movement of the object 24 (e.g., via the conveyor 22) enables subsequent lines of the image to be acquired and, then the complete image to be acquired.

The system 20 may include a lighting system that generates the illumination field(s) 31 and distributes appropriate light levels to the object 24 as it passes through the field of view 30. The lighting system may include active light sources, such as a plurality of illuminators 32, (e.g., at least one for each of the one or more linear scanners 28). The illuminators 32 may be integral with or remote from respective ones of the linear scanners 28.

According to one embodiment, some of the one or more linear scanners 28 may be positioned (e.g., mounted on a frame 34) such that their respective fields of view 30 at least partially overlap. For example, as shown in the illustrated embodiment, a first linear scanner 28a may be positioned such that a first field of view 30a partially overlaps with a second field of view 30b of a second linear scanner 28b.

Similarly, the plurality of illuminators 32 may be positioned (e.g., mounted on the frame 34) such that their respective illumination fields 31 at least partially overlap. For example, as shown in the illustrated embodiment, the first linear scanner 28a may be positioned such that a first field of illumination 31a partially overlaps with a second field of illumination 31b of the second linear scanner 28b. As shown, the portions of the first and second fields of illumination 31a and 31b that overlap may include/enclose the portions of the first and second fields of view 30a and 30b that overlap.

The system 20 may include one or more optical elements 36 (e.g., mirrors, lenses, etc.) to redirect and/or focus the fields of view 30 as desired. Alternatively, one or more of the linear scanners 28 may be positioned such that their field(s) of view 30 are targeted directly to the object 24. The optical elements 36 may enable installation of the system 20 for image acquisition to be optimized from the point of view of the space occupied with respect to the conveyor 22 transporting the objects 24 and enables the field of view 30, and possibly also the beam(s) of light emitted by the lighting system, to be oriented towards the desired region.

The linear scanner 28 may acquire images of the object 24 and/or the machine-readable symbol 26 line by line and transmit said images to one or more decoders 39 of the system 20 that each reconstruct an image by assembling all the lines, and then processes the reconstructed image to extract (decode) the information of the machine-readable symbol 26, sends the reconstructed image, or make the reconstructed image available for a further processing apparatus. The system 20 may include a plurality of decoders 39 that are communicatively coupled to each other using, for example, a TCP/IP protocol on Ethernet. One of the decoders 39 may function as a primary that collects the data from the other decoders 39 and sends the data to a host processor 42 (e.g., a PC or a PLC).

The decoder 39 may execute a decoding algorithm that performs a bi-dimensional analysis of the acquired images such that the machine-readable symbol 26 may be properly read regardless of its orientation. The image acquisition may be controlled by a controller 37 (e.g., microprocessor) of the system 20, that may be integrated into the linear scanner 28, but may be also external and communicatively connected with the linear scanner 28. The controller 37 may receive information from external sensors 38, such as object height sensors, object presence sensors, speed sensors, etc. and use this information to regulate operating parameters of the linear scanner 28, such as sensitivity, position of the autofocus system, scanning speed, etc.

The linear scanners 28 typically include high resolution cameras/imagers and combined with the high speed at which the objects 24 normally move, typically between 0.8 and 3 m/s for applications concerning recognizing, tracking, and sorting objects, optical configurations with very short exposure times, and therefore very open diaphragms and a low depth of field may be optimal. To acquire images and read optical information in a wide range of distances, as typical for industrial applications (for example for identifying and sorting parcels), the linear scanners 28 may be provided with an autofocus system.

The linear scanners 28 may be calibrated and/or operated based on operational parameters of the system 20 (e.g., speed of the object 24 relative to the linear scanner 28). As shown in the illustrated embodiment, the speed of the object 24 may be equal to the speed of the conveyor 22. The system 20 may include a speed sensor 40 (e.g., an optical encoder associated with the conveyor 22 that generates data (e.g., a square wave whose frequency is proportional to the speed of the conveyor 22).

According to one embodiment, the system 20 may be devoid of a separate speed sensor, and instead the controller of the conveyor 22 itself may generate the data directly. Additional information (e.g., object height, object lateral position, etc.) may be provided by the external sensors 38 and used by system 20 to calibrate and/or operate the linear scanners 28.

The system 20 may initiate acquisition of the sequence of lines, or rows, constituting the image and determine how long the acquisition lasts. Illumination of the object 24 by more than one of the illuminators 32 at the same time (i.e., when the system 20 includes multiple linear scanners 28 having a shared field of view) may result in overexposure of the object 24 and the machine-readable symbol 26, and thus result in a degradation in quality of the images captured by the overlapping linear scanners 28.

According to one embodiment, all of the plurality of the linear scanners 28 of the system 20 may share the same "trigger" that starts the acquisition of the sequence of lines that constitute a frame. The system 20 may include a trigger source (e.g., a presence sensor, such as a photocell) that detects the presence of the object 24 along a horizontal line perpendicular to the direction of travel of the conveyor 22 and generates a trigger signal in response to detection of the presence of the object 24. The trigger source may include a height sensor that generates a trigger signal when a measured height exceeds a certain predefined threshold.

The start and the end of the acquisition may be initiated by a start/stop signal generated by the trigger source. However, according to one embodiment, acquisition may not start as soon as the trigger source detects the object 24, but starts with a delay predetermined for every linear scanner 28 of the system. The delay for each of the linear scanner 28 may be based on factors including, but not limited to, distance between the trigger source and the view line within the field of view 30 of the linear scanner 28, the view angle of the linear scanner 28, the speed of the object 24 on the conveyor 22, and the measured height of the object 24.

The external sensors 38 may be physically, directly, connected to the linear scanner(s) 28 or indirectly (e.g., via the controller 37) that processes the information and "distributes" the information to the linear scanner(s) 28. The controller 37 may additionally initiate activation of one or more of the illuminators 32. Each of the linear scanner(s) 28, based at least in part on the information received from the sensors 38, may adapt its own acquisition parameters (e.g., trigger of image acquisition, length of exposure, etc.).

In general, each of the linear scanners 28 may regulate its own acquisition frequency (i.e., the scanning frequency, or the number of lines acquired per second), so that the spatial distance between two scanned subsequent lines remains constant. For example, the acquisition frequency may depend on the speed of the object 24.

As discussed above, poor image quality may result during conveyor stops and restarts if the encoder step is too long. In these cases, a high-resolution encoder may be used to directly trigger the line acquisition of each linear scanner 28. Distributing the acquisition trigger information to all the linear scanners 28 via a high-speed bus with a low delay variability (jitter) enables the system 20 to maintain the correct distance of the acquired lines on the target (object 24 and/or machine-readable symbol 26). For example, to acquire 50,000 lines per second correlates to a line acquisition period of 20 microseconds. Thus, an error of 2 microseconds would introduce a 10% error in the line distance on the target/object 24. An error of this scale may result in artefacts/distortions of the acquired images that would render the result unacceptable for the purposes of reading and decoding the machine-readable symbol 26.

Additionally, as discussed above, overexposure and poor image quality may result from a region of the object 24 (e.g., the machine-readable symbol 26) being illuminated simultaneously by multiple illuminators 32 (i.e., illuminators 32 associated with both the first linear scanner 28a and the second linear scanner 28b).

One approach to avoid overexposure is described in U.S. Pub. No. 2010/0013934A1. Specifically, the illumination systems of cameras with overlapping acquisition areas are not continuously switched on, but are enabled only when the respective camera is actively acquiring an image. Low exposure times and alternating acquisitions from different cameras ensures that each camera will "see" only its own field of illumination thereby avoiding overexposure.

However, this approach being successful is dependent upon all the cameras that have overlapping fields of view acquiring images at the same frequency and with the correct delay between acquisitions. Accurate coordination of the cameras as described typically relies on a strong time synchronization between the cameras and illuminators. Considering the preceding example of cameras acquiring 50,000 lines per second, each camera has 10 microseconds (half of the total period) to switch on its illuminator, acquire an image, and switch its illuminator off. If one camera is late or anticipates its acquisition by 1 microsecond the two cameras will illuminate and acquire together for 10% of the time resulting in overexposed images.

The acquisition trigger is often distributed to all the cameras as a digital signal using a dedicated line. This guarantees the maximum transmission speed and the minimum jitter but increases the number of wires to install in the system and the risk of malfunctioning. Distributing the acquisition trigger on a network 41 already connecting the cameras would create too much traffic and would not guarantee the required timing precision.

Two approaches to avoiding these timing issues that may result in image distortion or overexposure of the machine-readable symbol 26 are described below.

Figure 2:
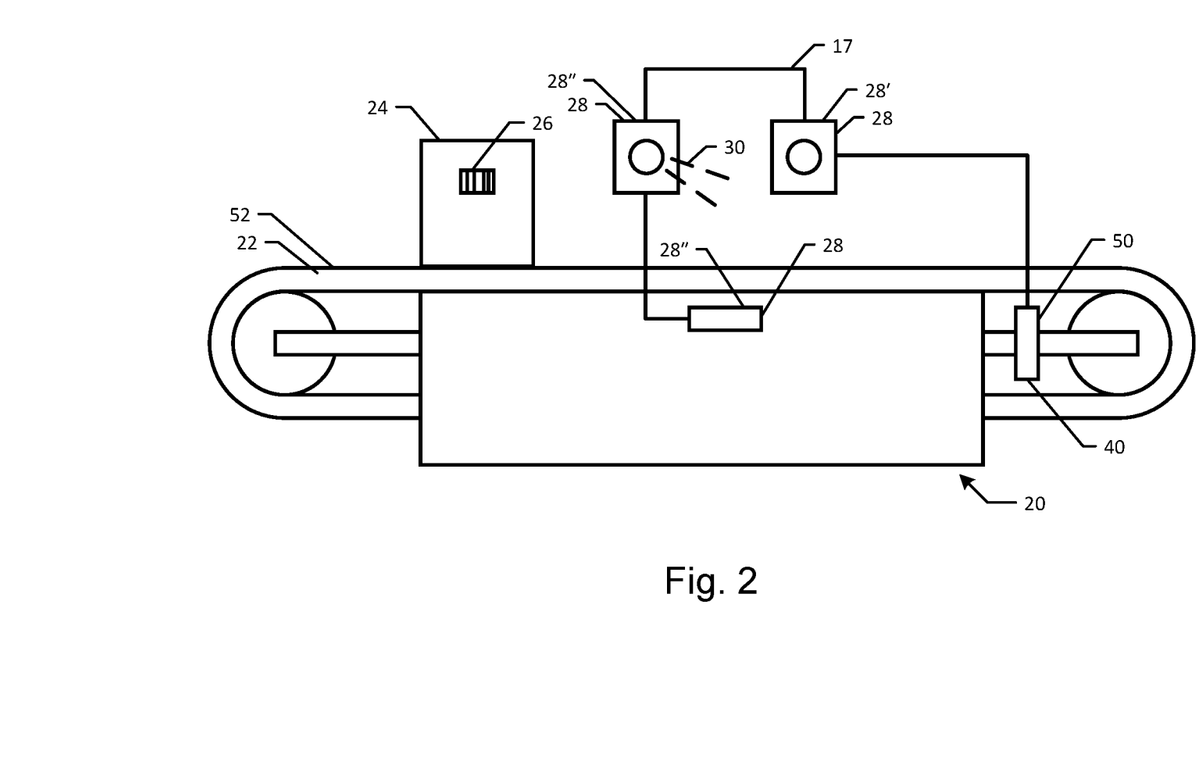
FIG. 2 is a schematic diagram of a system including multiple linear scanners and an object bearing a machine-readable symbol to be read, according to at least one illustrated embodiment.

Referring to FIG. 2, the system 20 may include the speed sensor 40 in the form of an encoder 50 (e.g., an optical encoder). The encoder 50 may be associated with the conveyor 22 (e.g., a conveyor belt 52) such that the encoder 50 generates data (e.g., a message) indicative of the distance the conveyor 22 has advanced and/or the speed of the conveyor 22. According to one example, the data message is in the form of a square wave, with a series of pulses, a pulse being generated each time the conveyor 22 advances by a delta space (i.e., a unit of distance, such as 0.1 millimeters). Thus, the speed of the conveyor 22 may be determined based on the period of the pulses included in the encoder data.

When the conveyor 22 is running at higher speeds (e.g., during normal operation of the system 20), the period of the pulses in the encoder data is smaller than when the conveyor 22 is running at lower speeds (e.g., during "Stop & Go" operations of the system 20). A longer period between pulses of the encoder data may result in less accurate speed measurements, which in turn may result in loss of image quality acquired by the one or more linear scanners 28.

According to one embodiment, the system 20 may include a network 17 communicatively coupling the one or more linear scanners 28. As shown, a component of the system 20 (e.g., a primary scanner 28') may be communicatively coupled to the encoder 50 such that the component receives data (e.g., the period of the pulses) from the encoder 50 and transmits an output (e.g., in the form of instructions) to the one or more linear scanners 28. Thus, the component may act as a controller (e.g., the controller 37). Based on the received control signals, the linear scanners 28 may adjust their acquisition parameters. The one or more linear scanners 28 may include a primary scanner 28' and one or more secondary scanner 28", with the primary scanner 28' performing as the component/controller that receives the data from the encoder 50. The network 17 may coincide with the network 41 connecting the decoders 39.

The system 20 may be operable in two different, but complimentary modes of operation. In a first mode of operation (referred to herein as "Mode 1") of the system 20, line synchronization triggers are sent directly to each of the one or more linear scanners 28. According to one embodiment, the primary scanner 28' may generate and send the line synchronization triggers after a certain number of pulses are received from the encoder 50. Each of the plurality of linear scanners 28 receives the line synchronization trigger and then executes a line acquisition after a pre-programmed delay. The pre-programmed delay for the plurality of linear scanners 28 is calibrated such that ones of the plurality of linear scanners 28 with a shared field of view 30 do not execute at the same time, thus preventing overexposure.

In Mode 1 the line synchronization performs as an absolute clock for the one or more linear scanners 28. The absolute clock is automatically tuned to the speed of the conveyor 22, as the line synchronization is generated directly from the pulses of the encoder 50. For Mode 1 to perform optimally, the network 17 connecting the primary scanner 28' and the secondary scanners 28" should have very low latency and very low levels of jitter (variation in latency on a packet flow).

The low jitter levels may not be achievable on a standard Ethernet network. Thus, according to one embodiment, the network 17 may be a TSN (time-sensitive network), an Ethernet network implementing additional hardware protocols that improve timing predictability. Limiting the use of Mode 1 to low conveyor speed, such as during Stop & Go, enables the system 20 to benefit from the accuracy of a shared acquisition trigger while avoiding network congestion.

In a second mode of operation (referred to herein as "Mode 2") of the system 20, speed values for the conveyor 22 are sent to each of the one or more linear scanners 28. In Mode 2 the primary scanner 28' may send the speed value of the conveyor 22 received from the encoder 50 to each of the secondary scanners 28". The one or more linear scanners 28 update their operational parameters (e.g., scanning frequency) based on the received speed values of the conveyor 22. Alternatively, the primary scanner 28' may transmit the scanning frequency to the secondary scanners 28".

The delay jitter introduced by a TSN network is very low compared to a standard Ethernet but still too high to synchronize the cameras and avoid overexposure when using the method of EP2126781B1. To reach a sufficient precision, the linear scanners 28 must share the same absolute time and execute the trigger commands of Mode 1 or set-speed commands of Mode 2 synchronously. The precise time synchronization of a TSN network is able to align the nodes clocks with sufficient accuracy.

According to one embodiment, the system 20 may operate in Mode 1 when the speed of the conveyor 22 is below a certain threshold and may transition to operate in Mode 2 when the speed of the conveyor 22 is at or above the certain threshold. As discussed above, the speed of the conveyor 22 may correlate to the period of the encoder pulses. Thus, the certain threshold may be defined in terms of the period of the encoder pulses. Accordingly, the system 20 may operate in Mode 1 when the period of the encoder pulses is below a certain threshold and transitions to Mode 2 when the period of the encoder pulses is at or above the certain threshold. The certain threshold may be within a range between 0.5 and 5 milliseconds (e.g., 1 millisecond).

A method of operation of a system 20 includes operating the conveyor 22 at a first speed that is below a threshold value. The method further includes measuring the first speed of the conveyor 22 with the encoder 50, wherein the encoder generates data that includes a pulse every time the conveyor 22 advances by a certain distance. According to one embodiment the encoder step can be between 0.1 and 50 millimeters, the conveyor speed may vary from 0 to 4 meter per second and the encoder period threshold is between 0.5 milliseconds and 2 milliseconds. For example, considering to trigger an acquisition every encoder step of 0.1 millimeters and a minimum time between acquisition triggers of 1 milliseconds, the threshold speed will be 0.1 meters per second.

The encoder signal, including the pulses, may be sent to a component of the system 20 (e.g., the primary scanner 28'). After receiving a select number of pulses, while the conveyor 22 is operating at a speed below the threshold value (i.e., in Mode 1), the component (e.g., the primary scanner 28') sends a line synchronization trigger to the one or more linear scanners 28 (e.g., the secondary scanners 28").

Upon receipt of the line synchronization trigger, each of the secondary scanners 28" acquires a line image of at least a portion of the field of view 30 of the respective secondary scanner 28" (and the object 24/machine-readable symbol 26 positioned there within). One or more of the secondary scanners 28" may have a pre-programmed delay that begins after receipt of the line synchronization trigger and must conclude prior to the secondary scanner 28" executing the scan. This process may repeat such that every time the component (e.g., the primary scanner 28') receives the select number of pulses (while the conveyor 22 is operating at a speed below the threshold value) another line synchronization trigger is sent.

The method may include increasing the operating speed of the conveyor 22 to a second speed that is at or above the threshold value. While the conveyor 22 is operating at a speed at or above the threshold value (i.e., in Mode 2), the component (e.g., the primary scanner 28') may send a signal to the one or more linear scanners 28 (e.g., the secondary scanners 28") that identifies the value for the speed at which the conveyor 22 is operating.

Upon receipt of the speed value, each of the secondary scanners 28" updates its scanning frequency based on the received speed value. The one or more linear scanners 28 execute scans to acquire an image of at least a portion of the field of view 30 of the respective one or more linear scanners 28. One or more of the linear scanners 28 may have a pre-programmed delay that prevents multiple linear scanners 28 with overlapping fields of view 30 from executing a scan simultaneously.

While the operating speed remains relatively constant (e.g., within +/−5% within a given time frame), the component (e.g., the primary scanner 28') may refrain from sending additional signals to the secondary scanners 28" that identify the speed value (or send speed values at a reduced rate compared to when the operating speed is changing, for example greater than +/−10% within a given time frame).

Figure 3:
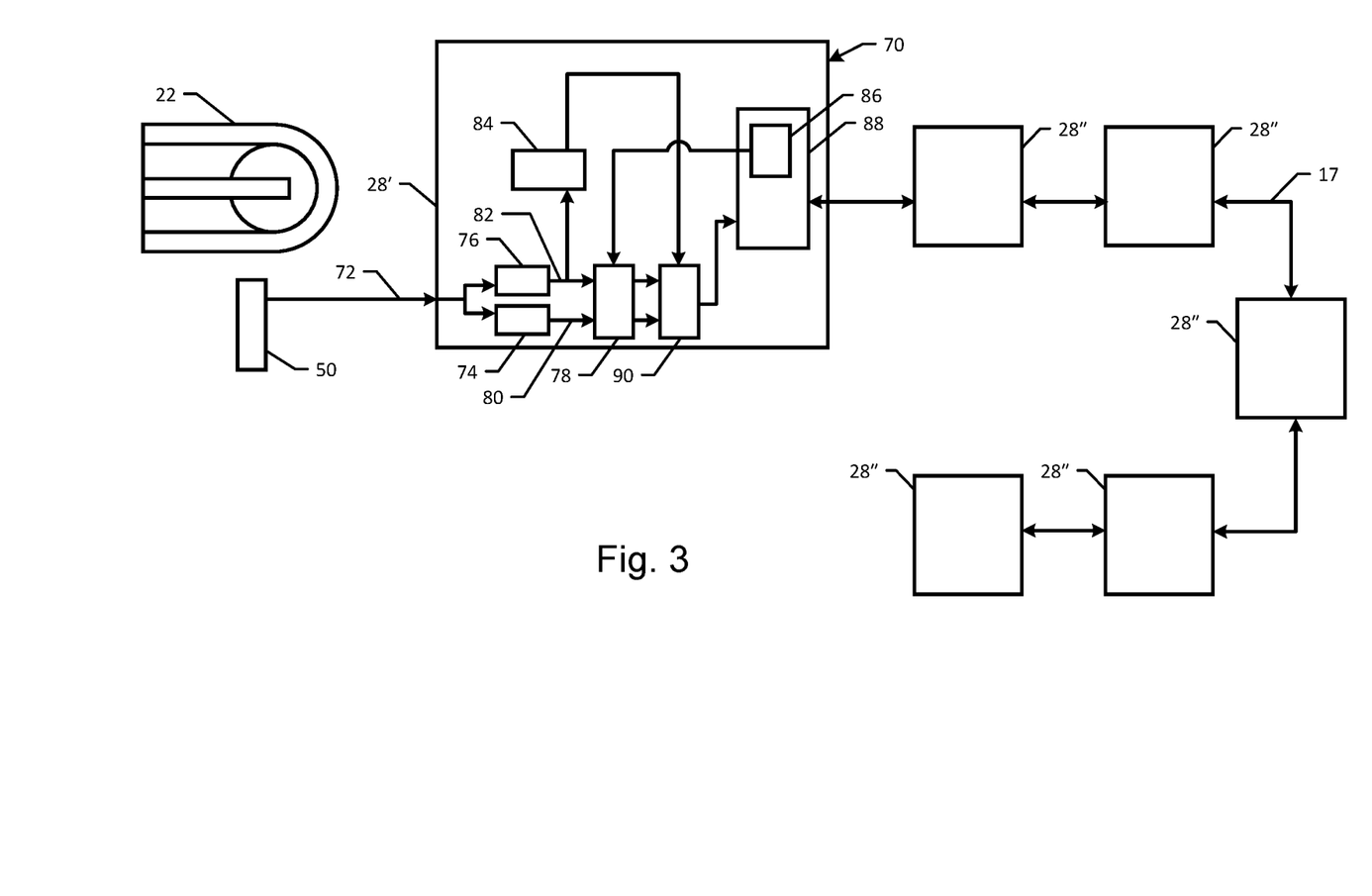
FIG. 3 is a schematic diagram of a system including multiple linear scanners, including a block diagram of a controller, according to at least one illustrated embodiment.

Referring to FIG. 3, a block diagram of the network 17 may include an embodiment of a controller 70, which may be integral with the primary scanner 28'. The network 17 may instead include other embodiments of the controller 70 with architecture different from what is illustrated. The controller 70 may be communicatively coupled to the encoder 50 (or alternatively directly to the device controlling the conveyor 22) such that the controller 70 receives an input signal 72 from the encoder 50 (or directly from the conveyor 22) that indicates the speed of the conveyor 22.

According to one embodiment, the input signal 72 includes a number of pulses, with each of the pulses being generated after the conveyor 22 advances a selected distance. The input signal 72 may be sent to both a Line Sync Generator 74 and a Speed Meter 76. The Line Sync Generator 74 counts the number of pulses in the input signal 72 and generates a line synch message 80 every $n^{th}$ pulse (where n is a selected value), that is sent to a Cycle and Time Controller 78.

The Speed Meter 76 uses the pulses from the input signal 72 to determine the speed value of the conveyor 22. The speed value may be determined using any known method and then a speed value message 82 may be sent to the Cycle and Time Controller 78 and a Speed Threshold block 84.

The Cycle and Time Controller 78 receives the line synch message 80 and the speed value message 82 as inputs in addition to a Real Time Clock 86, which may be part of a TSN switch 88, and generates the line sync and speed messages. Speed messages may be generated every System Cycle period. The value for the System Cycle Period may vary based on operating parameters of the conveyor 22. The System Cycle Period may be on the order of hundreds of microseconds up to a few milliseconds. The speed value message 82 may be transmitted at the start of every System Cycle. Both line sync and speed messages may contain an execution time information that allows the execution synchronization on all the secondary scanners. To ensure all instructions are executed on time by all the secondary scanners, the execution time may be the current network time plus a delay greater than the maximum network delay.

The Cycle and Time Controller 78 sends a first output, including the speed value message 82, and a second output including the line synch message 80 to an Output Multiplexer 90. The Speed Threshold block 84 may measure the speed of the conveyor 22 (e.g., via the period of the pulses in the input signal 72) and determines the operating mode of the transmission. If the speed is below a certain threshold the Speed Threshold 84 instructs the Output Multiplexer 90 to output line sync messages. If the speed is at or above a certain threshold the Speed Threshold block 84 instructs the Output Multiplexer 90 to output Speed messages. The Output Multiplexer 90 output (e.g., an Ethernet Frame) is sent to the TSN Switch 88, which transmits the output to the secondary scanners 28"

Figure 4:
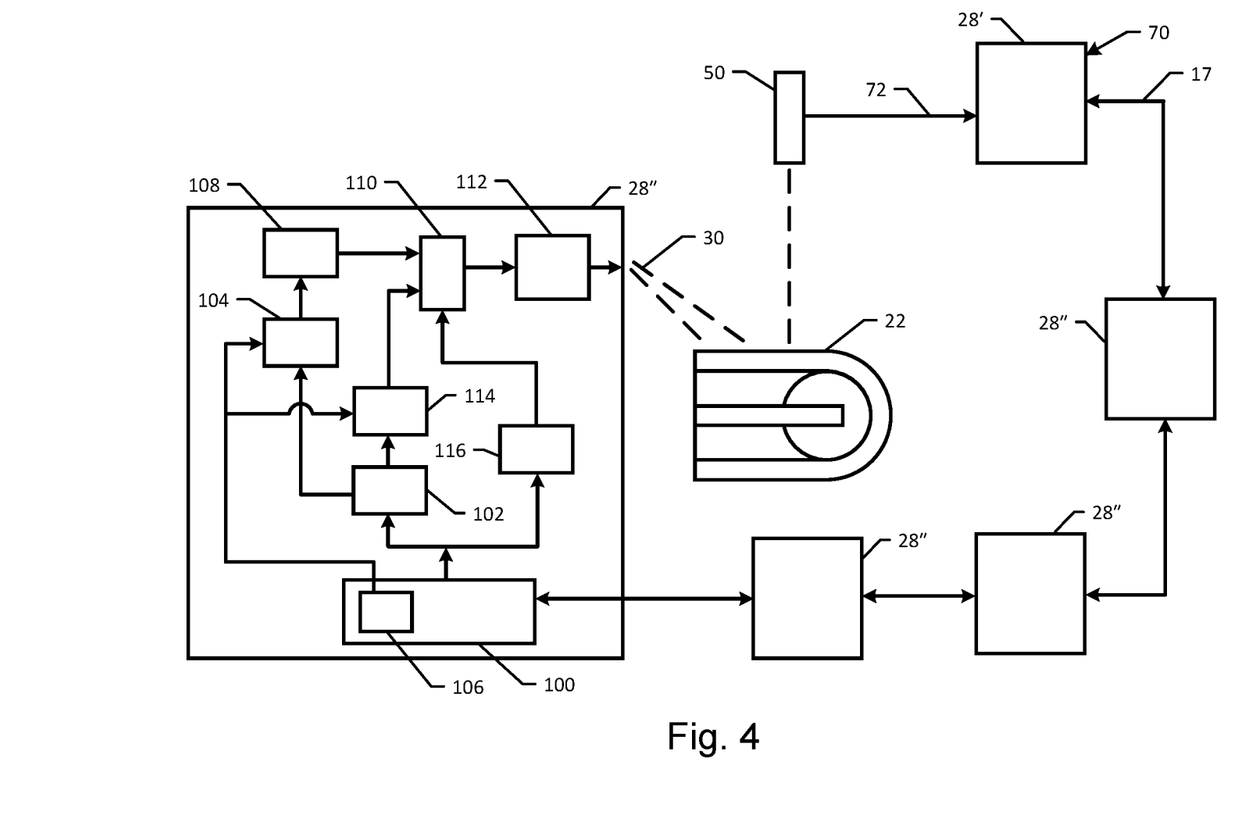
FIG. 4 is a schematic diagram of a system including multiple linear scanners, including a block diagram of a secondary linear scanner, according to at least one illustrated embodiment.

Referring to FIG. 4, a block diagram of the network 17 may include an embodiment of one of the secondary scanners 28". The network 17 may instead include other embodiments of the secondary scanners 28" with architecture different from what is illustrated. The secondary scanner 28" may be communicatively coupled to the primary scanner 28' (e.g., directly or indirectly via other ones of the secondary scanners 28").

As shown, the secondary scanner 28" may be connected to the network 17 via a TSN switch 100. The TSN switch 100 may be the same as the TSN switch 88 described above. The TSN switch 100 sends the received message from the network 17 to a Message Decoder 102. The Message Decoder 102 analyzes the message received from the TSN switch 100 as an input and detects whether the message is the line synch message 80 or the speed value message 82.

If the Message Decoder 102 detects that the message is the speed value message 82 (i.e., the system 20 is in Mode 2), the Message Decoder 102 sends as an output the speed value and the requested execution time to a Line Acquisition Frequency Adjustor 104. The Line Acquisition Frequency Adjustor 104 also receives input from a Real Time Clock 106, which may be the same Real Time Clock 86 as described above, of the TSN switch 100. The Line Acquisition Frequency Adjustor 104 calculates an acquisition frequency for the secondary scanner 28" based on the speed value contained within the speed value message 82. The Line Acquisition Frequency Adjustor 104, at the execution time, sends the acquisition frequency to a Line Synch Generator 108.

According to one embodiment, all of the one or more linear scanners 28 (e.g., the primary scanner 28' and the secondary scanners 28") have the same clock, provided by TSN 802.1AS. Thus, all of the one or more linear scanners 28 will execute the line sync or speed commands at the same time.

The Line Synch Generator 108 generates Line Synch pulses with the latest frequency requested by the Line Acquisition Frequency Adjustor 104, and sends the Line Synch pulses to a Trigger Multiplexer 110. When the system 20 is in Mode 2, the Trigger Multiplexer 110 sends instructions to a Line Acquisition Trigger 112, which may directly control acquisition of images (e.g., a line within the field of view 30 of the secondary scanner 28").

If the Message Decoder 102 detects that the message is the line synch message 80 (i.e., the system 20 is in Mode 1), the Message Decoder 102 sends an output to a Line Synch Executor 114, which based on the Real Time Clock 106 and the execution time included in the message, generates a line acquisition pulse. The line acquisition pulse is output from the Line Synch Executor 114 to the Trigger Multiplexer 110, which then drives the Line Acquisition Trigger 112 to control acquisition of images.

The secondary scanner 28" may include a Mode Selector 116 that may detect when the message from the TSN switch 100 includes the line synch message 80, and upon detecting the line synch message 80, sets the Trigger Multiplexer 110 to select the output from the Line Synch Executor 114 instead of the output from the Line Synch Generator 108 (and vice versa).

Referring to FIGS. 1 to 5, a method 200 of acquiring images of the machine-readable symbol 26 may include at 202 moving the object 24 with the conveyor 22. At 204 the encoder 50 generates data that corresponds to advancement of the conveyor (e.g., a series of pulses, each pulse corresponding to the conveyor 22 advancing a unit of distance), and at 206 the encoder 50 sends the series of pulses to the controller 70.

Figure 5:
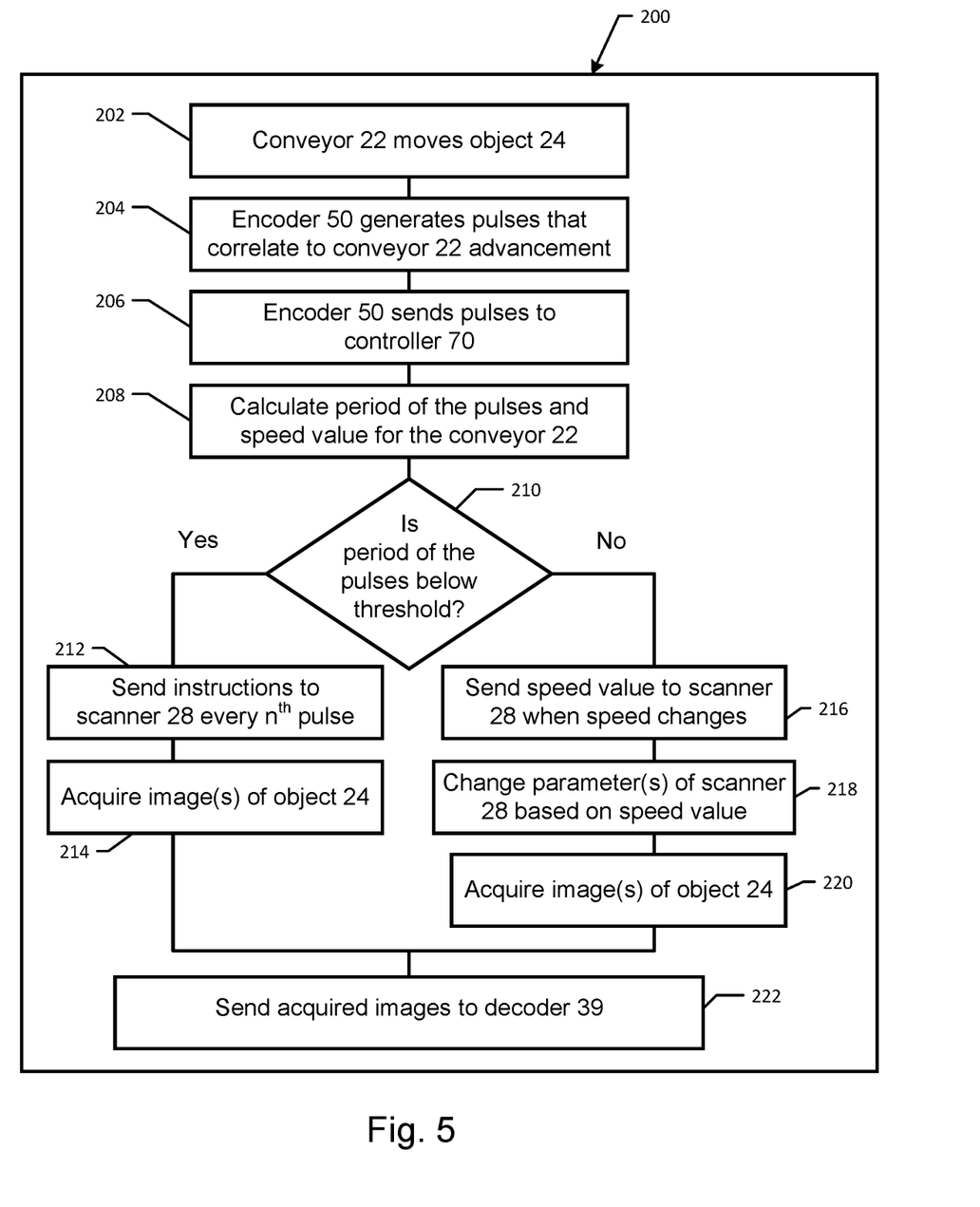
FIG. 5 is a schematic diagram of a method of acquiring images of a machine-readable symbol using one or more linear scanners, according to one embodiment.

At 208, the period for the series of pulses and the speed value for the conveyor 22 are calculated (e.g., by the controller 70). At 210, a component of the system 20 (e.g., the controller 70) determines whether the period of the pulses is below a threshold value.

At 212, if the speed value is below the threshold value, the method includes sending instructions to the one or more linear scanners 28 to acquire an image of the machine-readable symbol 26 carried by the object 24 every time a specific number of pulses are received by the controller 70. At 214, after receiving the instructions, the method includes acquiring an image of the machine-readable symbol 26 carried by the object 24 when the machine-readable symbol 26 is within the respective field of view 30 of each of the one or more linear scanners 28.

At 216, if the speed value is equal or above the threshold value, the method includes sending the calculated speed value to the one or more linear scanners 28. According to one embodiment, speed values may be sent periodically or when the calculated speed value changes by a threshold amount. According to one embodiment, the method may include sending data that corresponds to advancement of the conveyor 22 (e.g., the speed value, the series of pulses, the period of the series of pulses, etc.) directly to the one or more linear scanners 28.

Optionally, at 218, the method may include adjusting at least one operating parameter of the one or more linear scanners 28 based on the speed of the conveyor 22 (e.g., the calculated speed value). At 220, after receiving the calculated speed value, acquiring an image of the machine-readable symbol 26 carried by the object 24 when the machine-readable symbol 26 is within the respective field of view 30 of each of the linear scanners 28.

At 222, acquired images may be sent to the decoder 39, which reconstructs an image by assembling all the lines, and then processes the reconstructed image to extract (decode) the information of the machine-readable symbol 26.

Referring to FIGS. 1 to 4 and 6, a method 300 of acquiring images of a machine-readable symbol may include, at 302, advancing the conveyor 22 at a first speed, thereby moving the object 24 supported by the conveyor at the first speed. At 304, the method 300 may include sending a first set of instructions to the one or more linear scanners 28 to acquire images of a first machine-readable symbol carried by the object 24, wherein the first set of instructions include the first speed. At 306, the method 300 may include adjusting at least one operating parameter of the one or more linear scanners 28 based on the first speed. At 308, the method 300 may include acquiring one or more images of the first object with the one or more linear scanners 28.

Figure 6:
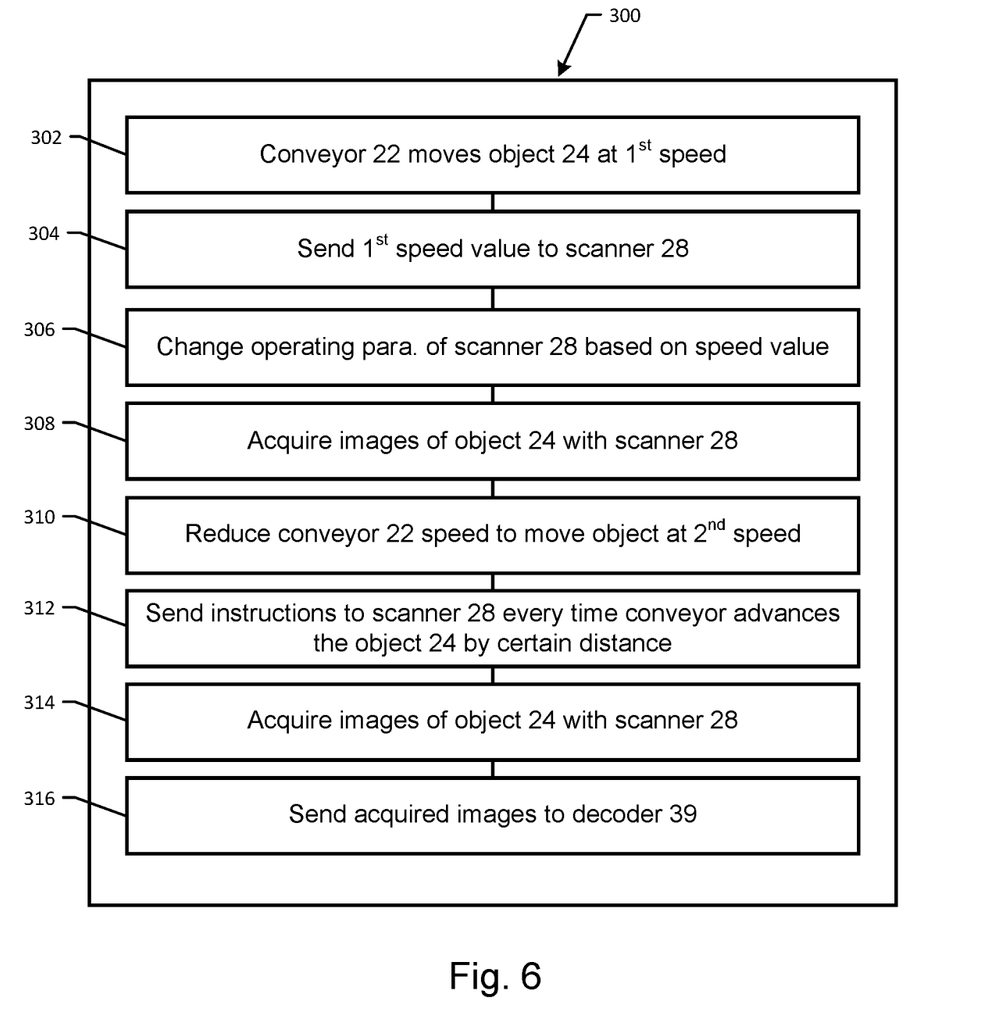
FIG. 6 is a schematic diagram of a method of acquiring images of a machine-readable symbol using one or more linear scanners, according to one embodiment.

At 310, the method 300 may include reducing the speed of the conveyor 22 (e.g., advancing the conveyor at a second speed that is lower than the first speed), thereby moving the object 24 supported by the conveyor 22 at the second speed. At 312, the method 300 may include sending a second set of instructions to the one or more linear scanners 28 every time the conveyor 22 advances a certain distance. At 314, the second set of instructions may trigger the one or more linear scanners 28 to acquire image(s) of the machine-readable symbol carried by the object 24.

At 316, acquired images may be sent to the decoder 39, which reconstructs an image by assembling all the lines, and then processes the reconstructed image to extract (decode) the information of the machine-readable symbol 26.

Referring to FIGS. 1 to 6, the system 20 may facilitate wired or wireless communication between components of the system 20 or with other devices. Different hardware supports and software protocols may be used. For example, most of the Ethernet based fieldbuses (e.g., Profinet or Ethercat) could be adopted instead of TSN. Bluetooth or 3GPP-5G could also be used.

The system 20 (e.g., the linear scanners 28) may also include one or more power supplies, which provide electrical power to the various components of the system 20 via power connections. Linear scanners according to other implementations may have less than all of these components, may contain other components, or both. In addition, the linear scanners 28 may include a radiofrequency identification (RFID) reader.

The following list includes examples of aspects of the disclosure.

Example 1—A method of acquiring images (e.g., the method 300) of a machine-readable symbol (e.g., the machine-readable symbol 26) may include advancing a conveyor (e.g., the conveyor 22) at a first speed, thereby moving an object (e.g., the object 24) supported by the conveyor at the first speed; sending a first set of instructions to a linear scanner (e.g. the linear scanner 28), wherein the first set of instructions includes the first speed; adjusting at least one operating parameter of the linear scanner based on the first speed; after adjusting the at least one operating parameter, acquiring an image of the machine-readable symbol carried by the object with the linear scanner; advancing the conveyor at a second speed that is slower than the first speed, thereby moving the object supported by the conveyor at the second speed; sending a second set of instructions to the linear scanner every time the conveyor advances a certain distance, the second set of instructions triggering the linear scanner to acquire respective images of the machine-readable symbol carried by the object.

Example 2—The method of Example 1, further including: advancing the conveyor at a third speed that is faster than the first speed, thereby moving the object supported by the conveyor at the third speed; sending a third set of instructions to the linear scanner to acquire an image of the machine-readable symbol carried by the object, wherein the third set of instructions include the third speed; adjusting the at least one operating parameter of the linear scanner based on the third speed, such that the at least one operating parameter of the linear scanner is different than when it was based on the first speed.

Example 3—The method of Example 1 wherein the linear scanner is a first linear scanner (e.g., the first linear scanner 28a), the method further comprising: sending the first set of instructions to a second linear scanner (e.g., the second linear scanner 28b), wherein the first linear scanner and the second linear scanner have at least partially overlapping fields of view (e.g. the field of view 30); adjusting at least one operating parameter of the second linear scanner based on the first speed; after adjusting the at least one operating parameter of the second linear scanner, acquiring respective images of the machine-readable symbol carried by the object with the second linear scanner; sending the second set of instructions to the second linear scanner every time the conveyor advances a certain distance, the second set of instructions triggering the second linear scanner to acquire respective images of the machine-readable symbol carried by the object.

Example 4—The method of Example 3, further comprising: pre-programming the second linear scanner to include a delay that is inserted prior to any image acquisition by the second linear scanner.

Example 5—The method of Example 4, further comprising: positioning the first and second linear scanners relative to the conveyor such that the object passes through the at least partially overlapping fields of view while being moved by the conveyor.

Various embodiments of the apparatus, devices and/or processes via the use of block diagrams, schematics, and examples have been set forth herein. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer-readable medium for use by or in connection with any computer and/or processor related system or method. In the context of this document, a memory is a computer-readable medium that is an electronic, magnetic, optical, or other another physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any means that can store, communicate, propagate, or transport the program associated with logic and/or information for use by or in connection with the instruction execution system, apparatus, and/or device. The computer-readable medium can be, for example, but not limited to, an electronic, magnetic, optical, electromagnetic, infrared, or semiconductor system, apparatus, device, or propagation medium.

More specific examples (a non-exhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as floppy disks, hard disk drives, CD ROMs, digital tape, and computer memory; and transitory or transmission type media such as digital and analog communication links using TDM or IP based communication links (e.g., packet links).

Those of skill in the art will recognize that many of the methods or algorithms set out herein may employ additional acts, may omit some acts, and/or may execute acts in a different order than specified. The various embodiments described above can be combined to provide further embodiments. Aspects of the embodiments can be modified, if necessary, to employ additional systems, circuits, and concepts to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A system comprising:
   at least one linear scanner having a field of view, wherein the at least one linear scanner acquires images of machine-readable symbols within the field of view, the linear scanner positionable relative to a conveyor such that an object transported by the conveyor passes through the first field of view;
   a controller that receives data as input that indicates movement of the object, the controller calculates the speed of the object, and the controller is communicatively coupled to the at least one linear scanner and sends an output to the at least one linear scanner,
   wherein when the calculated speed of the object is below a threshold value the output includes a line trigger that initiates acquisition of an image by the at least one linear scanner, and when the calculated speed of the object is at or above the threshold value the output includes the calculated speed of the object.

2. The system of claim 1 wherein when the calculated speed is below the threshold value, the output is sent to the at least one linear scanner every time the object travels a certain distance.

3. The system of claim 2, further comprising:
   an encoder communicatively coupled to the controller to transmit the data received by the controller as the input, the encoder generating a pulse every time the object advances by a unit of distance, and wherein the certain distance is calculated by multiplying the unit of distance by the number of pulses.

4. The system of claim 1 wherein when the calculated speed is at or above the threshold value, the output is sent to the at least one linear scanner periodically.

5. The system of claim 3 wherein the controller changes the output when the calculated speed crosses the threshold value.

6. The system of claim 1 wherein when the calculated speed is at or above the threshold value, the output is sent to the at least one linear scanner every time the calculated speed of the object changes by a threshold amount.

7. The system of claim 1 wherein the at least one linear scanner includes a first linear scanner and a second linear scanner each positionable relative to the conveyor such that: 1) a first field of view of the first linear scanner at least partially overlaps with a second field of view of the second linear scanner; and 2) the object transported by the conveyor passes through the overlapping first and second fields of view.

8. The system of claim 7 wherein at least one of the first linear scanner and the second linear scanner includes a pre-programmed delay to offset acquisition of an image of the object and prevent the first linear scanner and the second linear scanner from simultaneously acquiring an image of the object.

9. The system of claim 7 wherein the first linear scanner changes at least one operating parameter based and on the calculated speed of the object, and the second linear scanner changes at least one operating parameter based and on the calculated speed of the object.

10. The system of claim 9 wherein the at least one operating parameter includes scanning frequency, exposure length, gain, or any combination thereof.

11. The system of claim 1 wherein the controller and the at least one linear scanner are communicatively coupled by a TSN network.

12. The system of claim 1, further comprising:
the conveyor transporting the object;
an encoder that generates a pulse every time the conveyor advances by a unit of distance, and transmits the data received by the controller as the input.

13. A method of acquiring images of a machine-readable symbol, the method comprising:
recording a series of pulses that correspond to a conveyor advancing a unit of distance, and sending the recorded series of pulses to a controller;
calculating a speed at which the conveyor is advancing;
measuring a period between adjacent ones of the series of pulses;
if the period is at or above a threshold value, sending instructions to a linear scanner to acquire an image line of a machine-readable symbol carried by an object supported by the conveyor every time a specific number of pulses are received by the controller, and after receiving the instructions, acquiring an image line of the machine-readable symbol carried by the object when the machine-readable symbol is within a field of view of the linear scanner; and
if the period is below a threshold value, sending the calculated speed value to the linear scanner when the calculated speed changes by a threshold amount, and after receiving the calculated speed value, acquiring an image of the machine-readable symbol carried by the object when the machine-readable symbol is within the field of view of the linear scanner.

14. The method of claim 13 wherein the linear scanner is a first linear scanner and the field of view is a first field of view, the method further comprising:
if the period is at or above a threshold value, sending instructions to a second linear scanner to acquire an image of the machine-readable symbol carried by the object every time the specific number of pulses are received by the controller, and after receiving the instructions, acquiring an image of the machine-readable symbol carried by the object when the machine-readable symbol is within a second field of view of the second linear scanner; and
if the period is below a threshold value, sending the calculated speed value to the second linear scanner when the calculated speed changes by the threshold amount, and after receiving the calculated speed value, acquiring an image of the machine-readable symbol carried by the object when the machine-readable symbol is within the second field of view of the second linear scanner.

15. The method of claim 14 wherein the first field of view at least partially overlaps with the second field of view, and at least one of the first linear scanner and the second linear scanner includes a pre-programmed delay that offsets and prevents simultaneous acquisition of the images by the first linear scanner and the second linear scanner.

16. A method of acquiring images of a machine-readable symbol, the method comprising:
generating data that corresponds to advancement of a conveyor;
if a speed of the conveyor is below a threshold value:
sending the data to a linear scanner positioned relative to the conveyor such that an object carried by the conveyor passes through a field of view of the linear scanner; and
acquiring an image line of a machine-readable symbol carried by the object with the linear scanner every time the conveyor advances a first distance; and
if a speed of the conveyor is at or above the threshold value:
sending the data to the linear scanner every time the speed of the conveyor changes by at least a first amount; and
acquiring an image of the machine-readable symbol.

17. The method of claim 16 wherein the data includes a series of pulses, each of the pulses being generated when the conveyor advances a second distance.

18. The method of claim 17 wherein the data sent to the linear scanner includes the series of pulses.

19. The method of claim 17, further comprising:
measuring a period between adjacent ones of the series of pulses,
wherein the data sent to the linear scanner includes the period.

20. The method of claim 16, further comprising:
calculating a speed at which the conveyor is advancing based on the generated data,
wherein the data sent to the linear scanner includes the calculated speed.

* * * * *